United States Patent

Ryoo et al.

[11] Patent Number: 5,958,368
[45] Date of Patent: Sep. 28, 1999

[54] NONCRYSTALLINE MESOPOROUS MOLECULAR SIEVE SUBSTANCE AND METHOD FOR PREPARING THE SAME

[75] Inventors: Ryong Ryoo; Ji Man Kim, both of Taejon, Rep. of Korea

[73] Assignee: YuKong Limited, Seoul, Rep. of Korea

[21] Appl. No.: 08/788,159

[22] Filed: Jan. 24, 1997

[51] Int. Cl.$^6$ .................................................. C01B 33/20
[52] U.S. Cl. .......................... 423/705; 423/713; 423/326; 423/328.1
[58] Field of Search ..................... 423/701, 702, 423/704, 705, 713, 326, 328.1, 328.2

[56] References Cited

U.S. PATENT DOCUMENTS

| | | | |
|---|---|---|---|
| 5,211,934 | 5/1993 | Kresge et al. | 423/706 |
| 5,308,602 | 5/1994 | Calabro et al. | 423/705 |
| 5,589,153 | 12/1996 | Garces et al. | 423/700 |
| 5,593,655 | 1/1997 | Jongkind et al. | 423/702 |
| 5,695,735 | 12/1997 | Benazzi et al. | 423/700 |

FOREIGN PATENT DOCUMENTS 655 278   5/1995   European Pat. Off. .

OTHER PUBLICATIONS

Ryoo et al., "Structural Order in MCM–41 Controlled by Shifting Silicate Polymerization Equilibrium," J. Chem Soc., Chem. Commun., p. 711, 1995.

Coustel et al., "Improved Stability of MCM–41 through Textural Control," J. Chem. Soc., Chem. Commun., p. 967, 1994.

Antonelli et al., "Synthesis of Hexagonally Packed Mesoporous TiO2 by Modified Sol–Gel Method," Angew. Chem. Int. Ed. Engl., vol. 34 No. 18, p. 2014, 1995.

Ryoo, *Catalysis*, 12 (1) 32–39 (May 1996).

*Primary Examiner*—Mark L. Bell
*Assistant Examiner*—David Sample
*Attorney, Agent, or Firm*—Seidel Gonda Lavorgna & Monaco, PC

[57] ABSTRACT

Noncrystalline mesoporous molecular sieve substances are prepared using alkyltrimethylammonium halide as a surfactant in combination with water-soluble organic or inorganic salts capable of binding to a monovalent cation. The sieve substances are superior to the M41S series in thermal stability and hydrothermal stability. The sieve substances are structurized in such a manner that channels uniform in diameter are randomly arranged interconnecting with one another in a three-dimensional way so as to allow reactants to readily diffuse therein.

12 Claims, 15 Drawing Sheets

NONCRYSTALLINE MESOPOROUS MOLECULAR SIEVE SUBSTANCE AND METHOD FOR PREPARING THE SAME

BACKGROUND OF THE INVENTION

1. Field of the Invention

The present invention relates, in general, to a mesoporous molecular sieve substance and methods for preparing the same. More particularly, this invention relates to a noncrystalline mesoporous molecular sieve substance, superior over the M41S series of Mobil Co. in thermal stability, hydrothermal stability and structured in such a manner that channels of uniform diameter are randomly arranged in a three-dimensional way so as to allow the ready diffusion of reactants therein. Also, the present invention is concerned with methods for preparing the noncrystalline mesoporous molecular sieve substance.

2. Description of the Prior Art

Among solid substances known thus far, those having uniform channels, such as zeolites of porous crystalline aluminum silicate and of porous crystalline aluminum phosphates ($AlPO_4$) are defined as molecular sieves, because they selectively adsorb molecules smaller than the size of the channel entrance or they allow molecules to pass through the channel. In view of crystallography, zeolite and $AlPO_4$ are fully crystalline substances, in which the atoms and channels are arranged in complete regularity. These fully crystalline molecular sieves are obtained naturally or synthesized through hydrothermal reactions. The number of fully crystalline molecular sieves obtained or synthesized thus far amount to several hundred species. They play an important role as catalysts or supports in modern chemical industries by virtue of their characteristics including selective adsorption, acidity and ion exchangeability. Examples of the current catalyst processes utilizing the characteristics of zeolite include the petroleum cracking reaction using ZSM-5 and the aromatic conversion reaction of paraffin using KL-zeolite impregnated with platinum. A significant problem of the fully crystalline molecular sieve is that it cannot be used in reactions of molecules larger than 1.3 nm in size.

Recently, a group of researchers at Mobil Co. reported a series of mesoporous molecular sieves, named the M41S series, including MCM-41 and MCM-48. See U.S. Pat. Nos. 5,057,296 and 5,102,643. These molecular sieves show a structure in which mesopores uniform in size are arranged regularly. Existing molecular sieves have been produced by using inorganic or organic cations as templates, whereas those mesoporous molecular sieves are synthesized through a liquid crystal template pathway by using surfactants as templates. These mesoporous molecular sieves have the advantage that their pore sizes can be adjusted in a range of 1.6 to 10 nm by controlling the kinds of surfactants or synthetic conditions employed during the production process.

Stuky, a professor at the University of California, U.S.A. and his colleagues reported mesoporous molecular sieves, designated as SBA-1, 2, 3, in Science, 268, 1324 (1995). The channels of the mesoporous molecular sieves are regularly arranged, while the constituent atoms show an arrangement similar to that of amorphous silica.

Mesoporous molecular sieves have regularly arranged channels larger than those of existing zeolites, thus enabling their application to adsorption, isolation or catalyst conversion reactions of relatively large molecules. Of the aforementioned mesoporous molecular sieves, the most widely researched is MCM41, which has a uniform structure exhibiting hexagonal arrangement of straight mesopores, such as honeycomb, and has a specific surface area of about 1,000 $m^2g^{-1}$ as measured by ordinary BET. After being subjected to calcination to remove template materials, MCM-41 samples disclosed by early researchers undergo, although there is a little difference depending upon synthetic conditions, structure contraction ranging from 20 to 25% relative to pre-calcination. This contraction is attributed to the fact that silanol groups are condensed by the calcination.

However, the research data from the present inventors show that if the equilibrium of the silicate condensation reaction is shifted toward the product by controlling the pH of the reactants during the hydrothermal synthesis of MCM-41, the condensation of the silanol group is completed in advance, so that the weak thermal stability can be overcome. This achieves a considerable improvement in structural uniformity as disclosed in Journal of Chemical Society, Chem. common., 1995, p711. The MCM-41 thus obtained did not undergo structural decomposition even at 500° C. under 1 atm inthe presence of 100% water vapor. It contracted only slightly in structure even upon heating up to 900° C. under an oxygen atmosphere. A modified MCM-41 in which aluminum is substituted for silica has an acidity and ion exchangeability similar to that of existing zeolites. The modified MCM-41 can be used for various reactions requiring such properties.

Superior in thermal stability as it is, MCM-41 begins to lose its structure in water heated at 65° C. or higher, which is ascribed to the hydrolysis of the silicate constituents. Twelve hours after being heated in boiling water at 100° C., MCM-41 completely loses its structural characteristics. This poor hydrothermal stability serves as a serious limiting factor at temperatures 60° C. or higher. Three examples include: (1) the case of using a titanium-substituted molecular sieve in a partial oxidation reaction; (2) the case of a catalyst conversion reaction under a hydrothermal condition in which hydrogen peroxide is used as an oxidizing agent; or (3) the case of impregnating in the molecular sieve a transition metal, such as platinum, as a catalytically active ingredient. Further, when MCM-41 is subjected to calcination to remove templates, it is decomposed to form coke which is, in turn, likely to close the mesopores because MCM-41 has straight channels. Even when catalytically active ingredients, such as platinum or palladium, are impregnated, the passages are readily closed, which prevents molecules from diffusing. Thus, the metal molecules present on the inner side of the closed passages cannot be in contact with reactants and only those present at the opposite ends show catalytic activity. Therefore, active research and development efforts have been and continue to be directed to an improvement in the hydrothermal stability of mesoporous molecular sieves and in overcoming the molecular diffusion problem attributable to closed channels.

SUMMARY OF THE INVENTION

Therefore, it is an objective ofthe present invention to overcome the above problems encountered in the prior art and to provide methods for preparing a novel mesoporous molecular sieve substance superior in hydrothermal stability and free ofthe molecular diffusion barrier due to the closing of one-dimensional straight channel arrangement.

It is another objective of the present invention to provide the novel mesoporous molecular sieve substance.

In accordance with an aspect of the present invention, there is provided a method for preparing a noncrystalline mesoporous molecular sieve substance, comprising the steps of:

(A) mixing silicate salt and alkyltrimethylammonium halide as a surfactant, represented by the following formula I:

$$C_nH_{2n+1}(CH_3)_3NX \qquad I$$

wherein n is an integer of 12 to 18 and X is Cl or Br to prepare a mixed aqueous solution;

(B) adding to the mixed aqueous solution one or more water-soluble organic or inorganic salts which are capable of binding to a monovalent cation;

(C) subjecting the resulting mixture to hydrothermal reaction in such a way that suitable pH and temperature are maintained for a predetermined period so as to give precipitates of the molecular sieve substance;

(D) filtering and drying the precipitates of the molecular sieve substances; and (E) calcining the filtered and dried precipitates.

In accordance with another aspect of the present invention, there is provided a method for preparing a noncrystalline molecular sieve substance, comprising the steps of:

(a) mixing silicate salt, one or more salts selected from the group consisting of aluminates, borates and acid salts of 3d transition metals on the periodic table, and alkyltrimethylammonium halide as a surfactant, represented by the following formula I:

$$C_nH_{2n+1}(CH_3)_3NX \qquad I$$

wherein n is an integer of 12 to 18 and X is Cl or Br to prepare a mixed aqueous solution;

(b) adding in the mixed aqueous solution one or more water-soluble organic or inorganic salts which are capable of binding to a monovalent cation;

(c) subjecting the resulting mixture to hydrothermal reaction in such a way that suitable pH and temperature are maintained for a predetermined period so as to give precipitates of the molecular sieve substance;

(d) filtering and drying the precipitates of the molecular sieve substances; and (e) calcining the filtered and dried precipitates.

In accordance with a further aspect of the present invention, there are provided noncrystalline mesoporous molecular sieve substances, prepared by the above methods, in which channels of uniform diameter are randomly arranged in a three dimensional way.

BRIEF DESCRIPTION OF THE DRAWINGS

Other objectives and aspects of the invention will become apparent from the following description of embodiments with reference to the accompanying drawings in which.

DETAILED DESCRIPTION OF THE INVENTION

Figure 1:
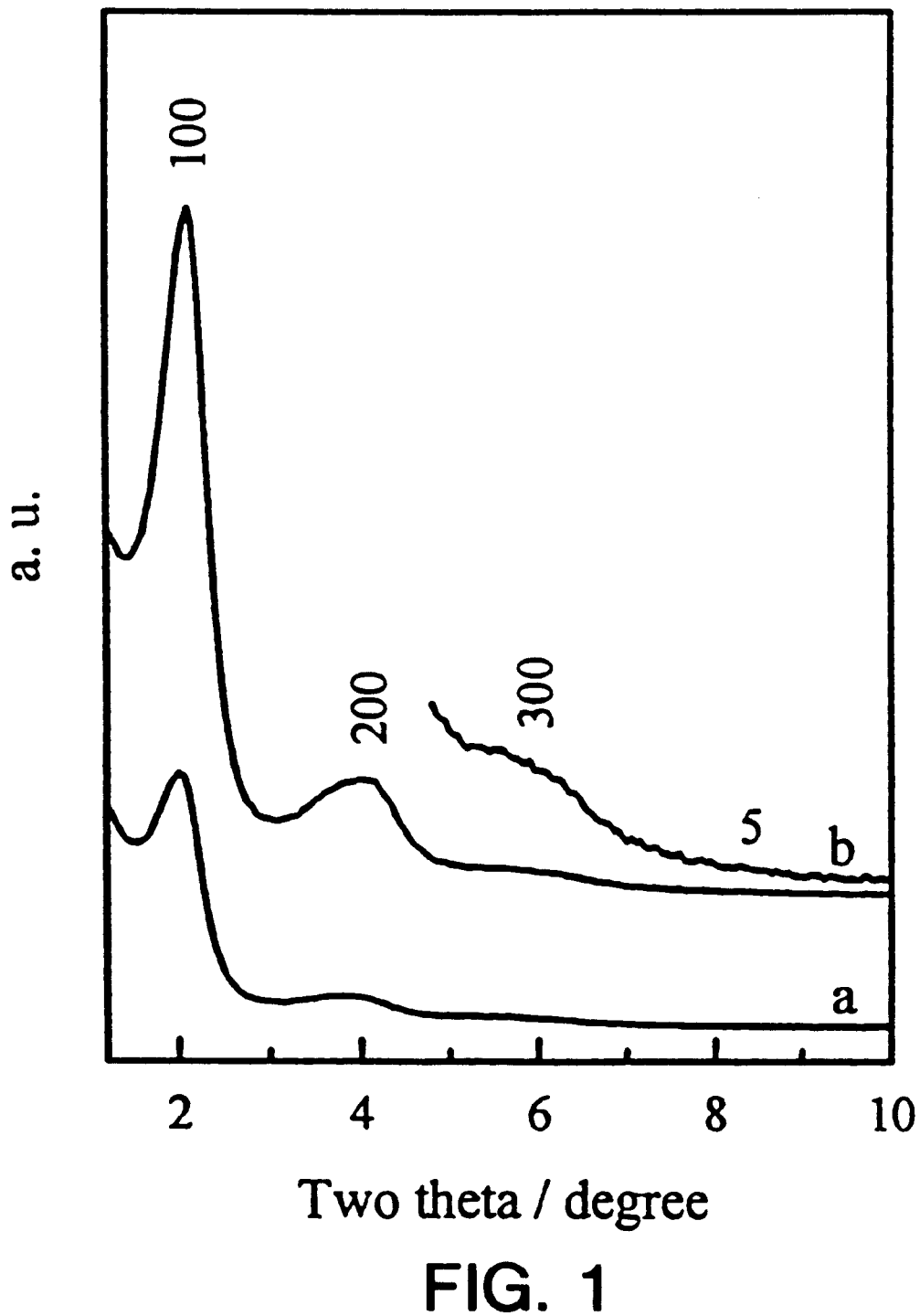
FIG. 1 shows X-ray diffraction patterns of KIT-1substance before calcination (a) and after calcination (b), according to Example 1 of the present invention.

Alkyltrimethylammonium halide of the above formula I is used as a surfactant in the present invention. Other preferred surfactants are hexadecyltrimethylammonium chloride (HTACl), dodecyltrimethylammonium bromide (DTABr), tetradecyltrimethyl ammonium bromide (TTABr) and octadecyltrimethylammonium bromide (OTABr). In the methods according to the present invention, an example of silicate salt used in steps (A) and (a) is sodium silicate and an example of a salt selected from the group consisting of aluminates, borates and acid salts of the 3d transition metals on the periodic table, as used in step (a) is sodium aluminate (NaAlO$_2$). The preferred organic or inorganic salts used in steps (B) and (b), which are able to bind to monovalent cations, such as Na+, K+ and NH$_4$+, and dissolve in water, are NaCl, KCl, CH$_3$COONa, NaBr, Na$_2$SO$_4$, NaNO$_3$, NaClO$_4$, NaClO$_3$, ethylenediaminetetracetic acid tetrasodium salt (EDTANa$_4$), adipic acid disodium salt, 1,3-benzenedisulfonic acid disodium salt or nitrilotriacetic acid sodium salt.

In the method according to the first aspect of the present invention, the water-soluble organic or inorganic salt capable of forming a bond with a monovalent cation (e.g. Na$^+$, K$^+$ and NH$_4^+$) is preferably used at an amount of 1.0 to 15.0 moles salt per mole of the alkyltrimethylammonium halide of Formula I. Similarly, the silicate salt is used at the same range.

In the method according to the second aspect of the present invention, and on the basis of one mole of the alkyltrimethylammonium halide of Formula I, the water soluble organic or inorganic salt capable of forming a bond with a monovalent cation (e.g. $Na^+$, $K^+$ and $NH_4^+$) and the silicate salt both are preferably used in an amount of 1.0 to 15.0 moles. If using one or more salts selected from the group consisting of aluminates, borates and acid salts of the 3d transition metals on the periodic table, a range of 0.0025 to 1.5 moles of salt is preferred per mole of the alkyltrimethylammonium halide of Formula I.

Addition of aqueous ammonia solution in steps (A) [step] and (a) [step] smoothly promotes the functioning of the surfactant. It is preferable that the calcination of the final step be carried out at a temperature of 500 to 600° C. in air.

As the result of performing the methods according to the present invention, there were obtained novel mesoporous molecular sieve substances. They were found to be noncrystalline and named "KIT-1". KIT-1 and MCM-41 are similar in that they have a large specific surface area (about 1,000 $m^2g^{-1}$ as determined by the BET process) and show a uniform distribution of channel sizes (the line width is not more than 1 nm at the medium height in a channel size distribution curve obtained from an adsorption isotherm of nitrogen by the Horvath-Kawazoe method). But, they are quite different in the connection of channels, which is the characteristic point for the present invention. In detail, MCM-41 produced by Mobil Co. has a structure in which cylindrical or hexagonal tubular channels uniform in diameter (not less than 2 nm, and able to be controlled depending upon production conditions) are arranged in hexagonal styles, such as honeycomb, with a stretch of passages much longer than their diameter. In contrast, KIT-1 of the present invention has a stretch of passages ranging from 2 to 10 nm, which is very short relative to that of MCM-41. Like the structure of dishcloth gourd, the passages are randomly interconnected in a three-dimensional way. So, when KIT-1 is used as a catalyst or as a support, the passage blockage, which frequently occurs in MCM-41 having a one-dimensional straight arrangement of channels, can be prevented. In addition, KIT-1 is far superior to MCM-41 in thermal stability and hydrothermal stability.

Serving as a surfactant, the alkyltrimethylammonium halide used for KIT-1 preparation forms a micelle structure. The added salts (NaCl, KCl, $EDTANa_4$, etc.) are dissociated into ions which, in turn, randomize the micelle structure by electrostatic interaction of micelle and ions. If silicate ions are added in this aqueous solution, they surround the liquid crystal structures randomly formed therein and are polymerized through a hydrothermal reaction to KIT-1 of mesoporous molecular sieve substance and surfactants. This KIT-1 is calcined at a temperature of 500 to 600° C. in air to remove the template.

A detailed description will be given of KIT-1 below, in conjunction with the accompanying drawings.

Referring to FIGS. 1 through 4, there are X-ray diffraction patterns of KIT-1 substances synthesized using various salts.

Figure 2:
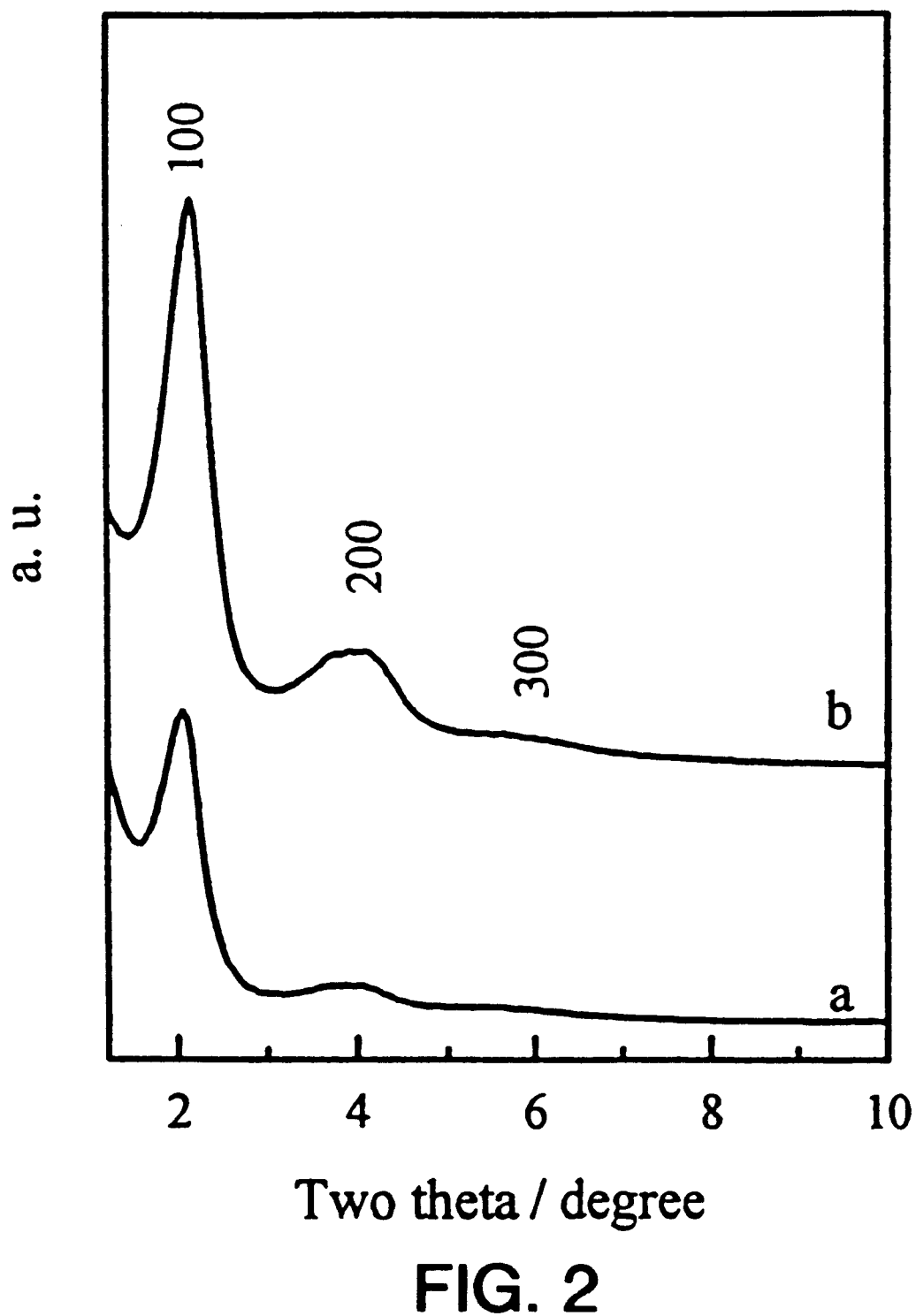
FIG. 2 shows X-ray diffraction patterns of KIT-1 substance before calcination (a) and after calcination (b), according to Example 3 of the present invention using adipic acid disodium salt.
Figure 3:
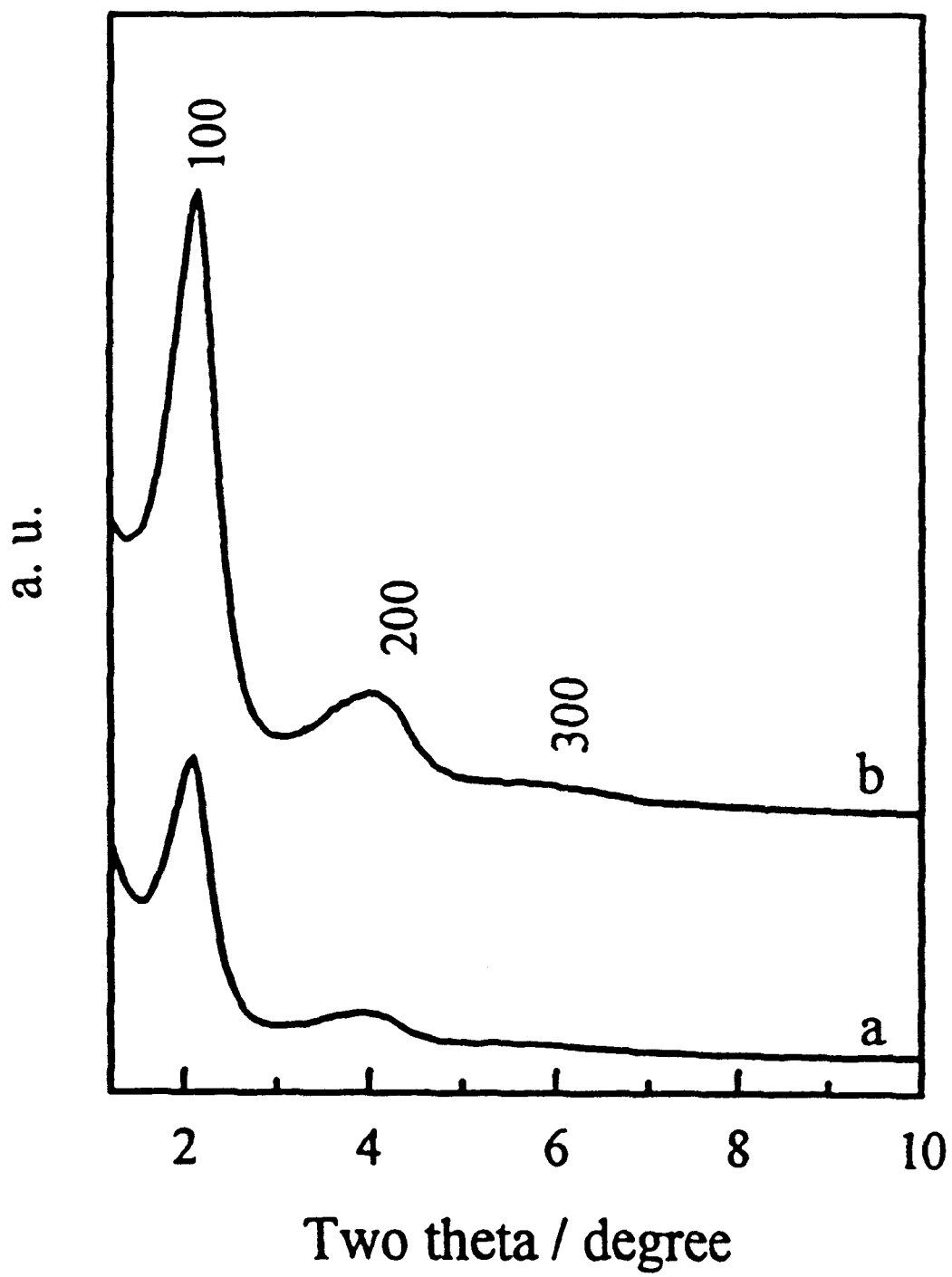
FIG. 3 shows X-ray diffraction patterns of KIT-1 substance before calcination (a) and after calcination (b), according to Example 3 of the present invention using 1,3 benzenedisulfonic acid disodium salt.
Figure 4:
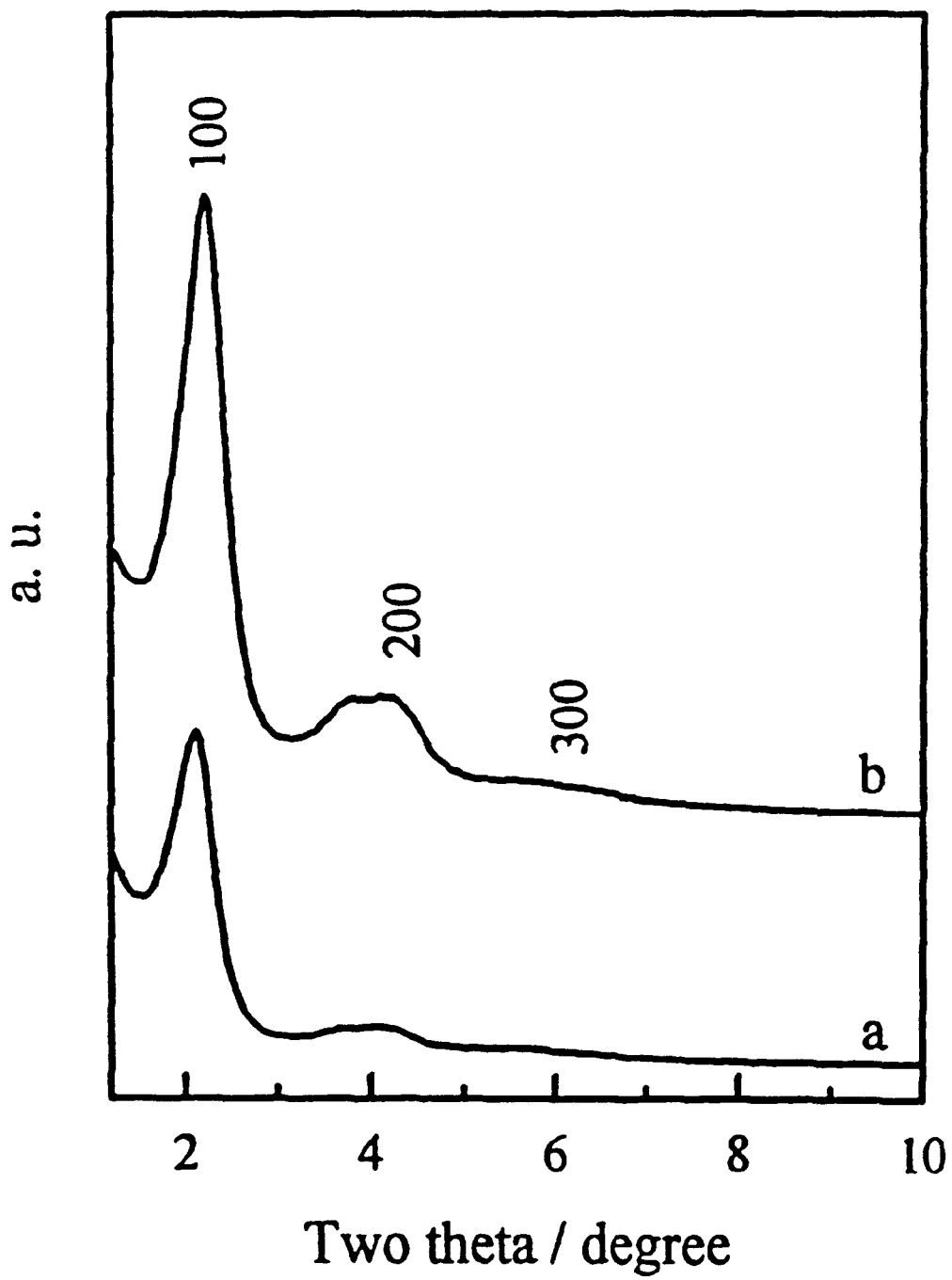
FIG. 4 shows X-ray diffraction patterns of KIT-1 substance before calcination (a) and after calcination (b), according to Example 3 of the present invention using NaCl.

FIG. 1 shows X-ray diffraction patterns of KIT-1 substances prepared from a reaction mixture, to be described in Example 1, comprising $HTAC1:(NH_4)_2O$: $EDTANa_4:SiO_2:H_2O$ (molar ratio 1:0.15:4:4:400), in which reference character "a" refers to KIT-1 substance before calcination and reference character "b" to KIT-1 substance after calcination. FIG. 2 shows X-ray diffraction patterns of KIT-1 substances prepared from a reaction mixture, as set forth in Example 3, comprising $HTAC1:(NH_4)_2O$:adipic acid disodium salt: $SiO_2:Na_2O:H_2O$ (molar ratio 1:0.15:8:4:1:400), in which reference character "a" refers to KIT-1 substance before calcination and reference character "b" to KIT-1 substance after calcination. FIG. 3 shows X-ray diffraction patterns of KIT-1 substances prepared from a reaction mixture, as set forth in Example 3, comprising $HTACL:(NH_4)_2O$:1'3-benzenedisulfonic acid disodium salt:$SiO2:Na2O:H_2O$ (molar ratio 1:0.15:8:4:1:400) in Example 3, in which reference character "a" refers to KIT-1 substance before calcination and reference character "b" to KIT-1 substance after calcination. FIG. 4 shows X-ray diffraction patterns of KIT-1 substances prepared from a reaction mixture comprising $HTAC1:(NH_4)_2O:NaCl:SiO_2:Na_2O:H_2O$ (molar ratio 1:0.15:4:4:1:400) in Example 3, in which reference character "a" refers to KIT-1 substance before calcination and reference character "b" to KIT-1 substance after calcination. In all the X-ray diffraction patterns, one peak with high intensity and two peaks with low intensity are shown. For convenience, these peaks are designated as (100), (200) and (300), respectively.

Figure 5:
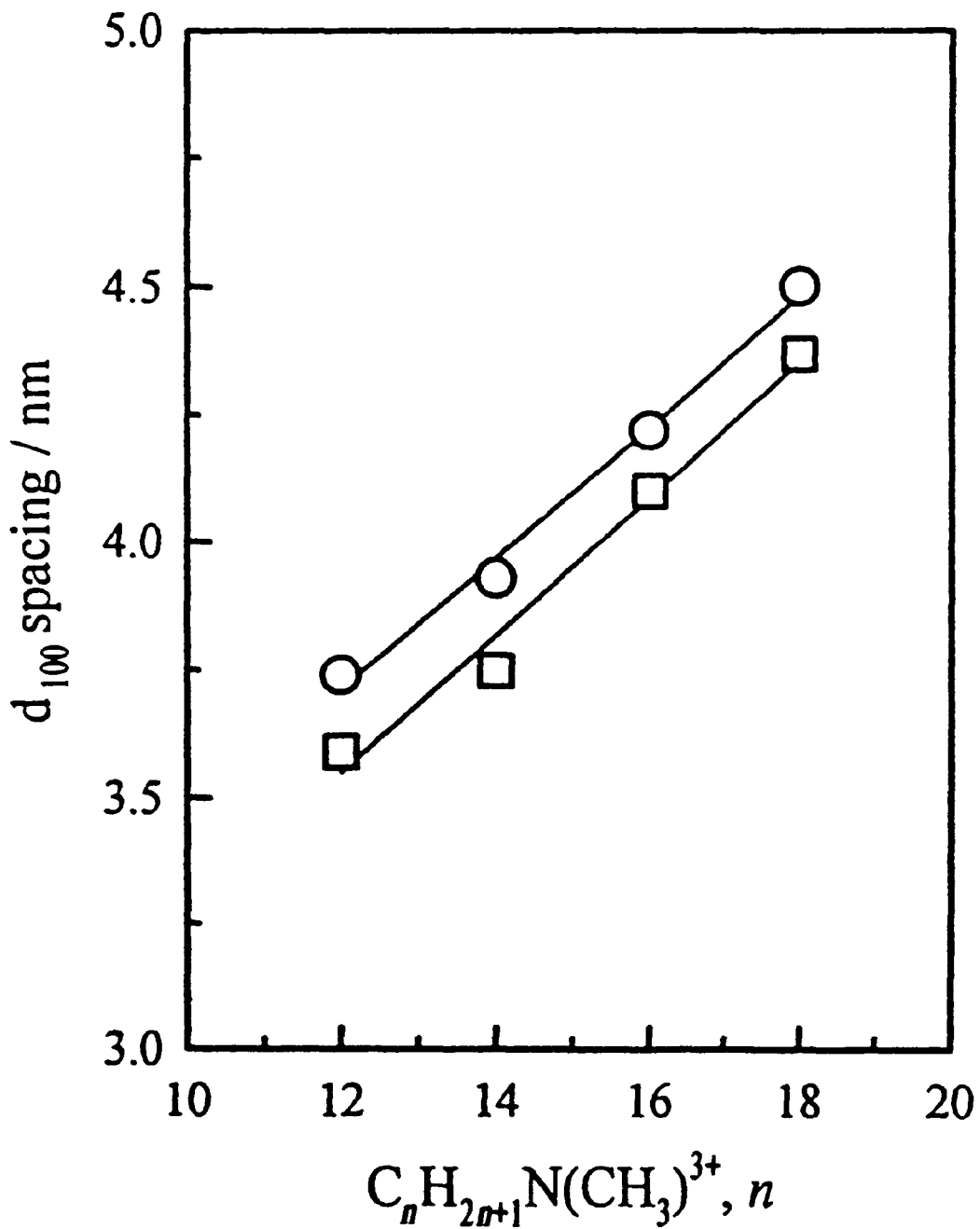
FIG. 5 shows the changes of $d_{100}$ in accordance with the alkyl chain length of the surfactant in X-ray diffraction patterns of KIT-1 substances before calcination (circle) and after calcination (square)

FIG. 5 contains plots showing the change of $d_{100}$ with the alkyl chain length of the surfactant of Formula I in X-ray diffraction pattern. The plots of FIG. 5 were obtained for KIT-1 of FIG. 1 using surfactant containing 16 carbon atoms, as well as for mesoporous molecular sieve substances obtained using Example 3 surfactants, including dodecyltrimethylammonium bromide (DTABr) (containing 12 carbon atoms), tetradecyltrimethyl-ammonium bromide (TTABr)(containing 14 carbon atoms) and octadecyl trimethylammonium bromide (OTABr) (containing 18 carbon atoms). Plots are shown for results obtained at pre-calcination (circle) and post-calcination (square) stages. As shown in these plots, $d_{100}$ increases with the alkyl chain length of the surfactant used as a template. KIT-1 substances which are deprived of surfactant, the template, by calcination at a temperature of 500 to 600° C. show X-ray diffraction patterns whose intensities increase only 2 to 3 times that of the KIT-1 before calcination, but no characteristic change is present in the patterns. FIG. 5 also shows that the calcination can reduce $d_{100}$ by 0.1 nm or less. That is, it is observed that the calcination causes a structure contraction by only 2 to 3% or less.

Figure 6:
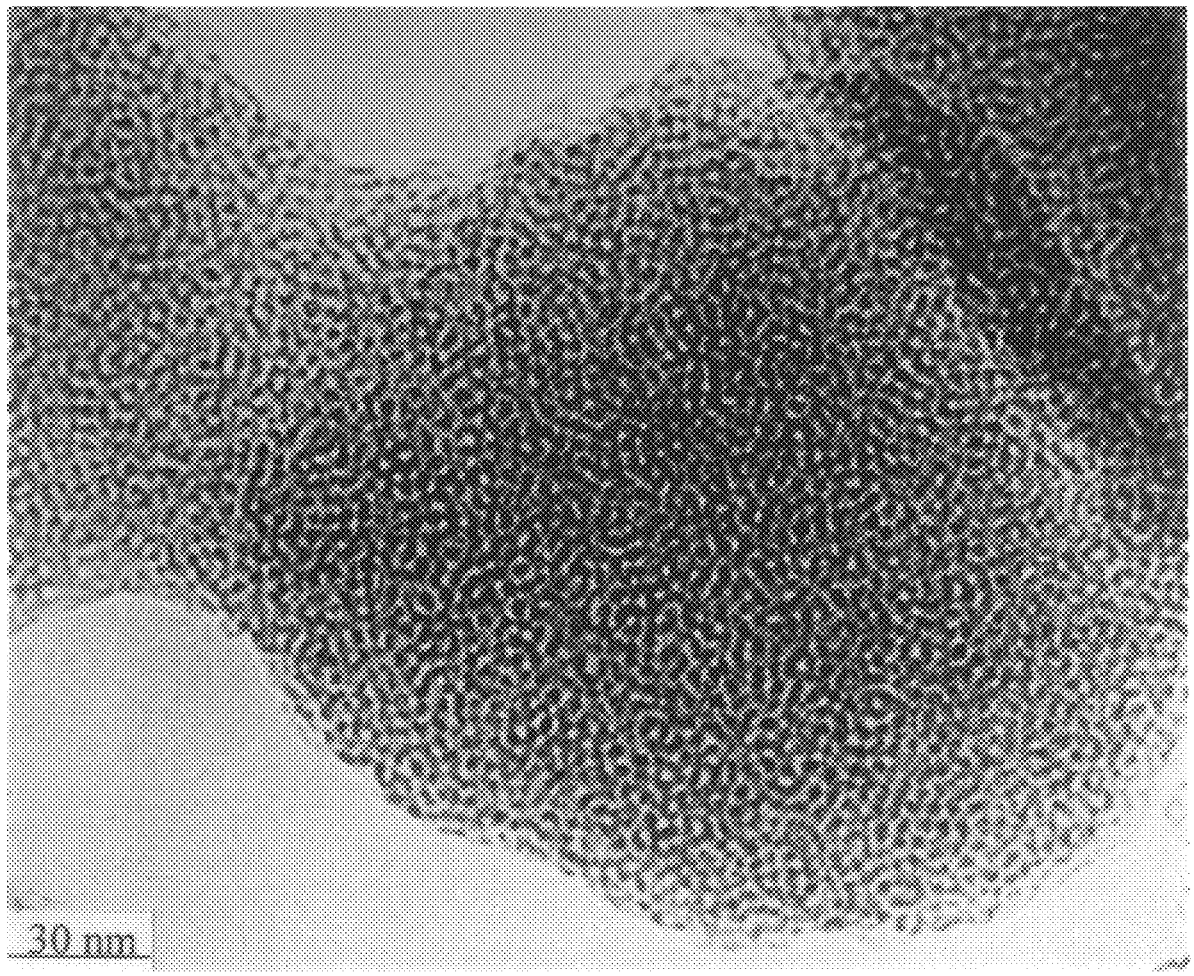
FIG. 6 shows a transmission electron micrograph of a pure silica KIT-1 sample of FIG. 1.
Figure 7:
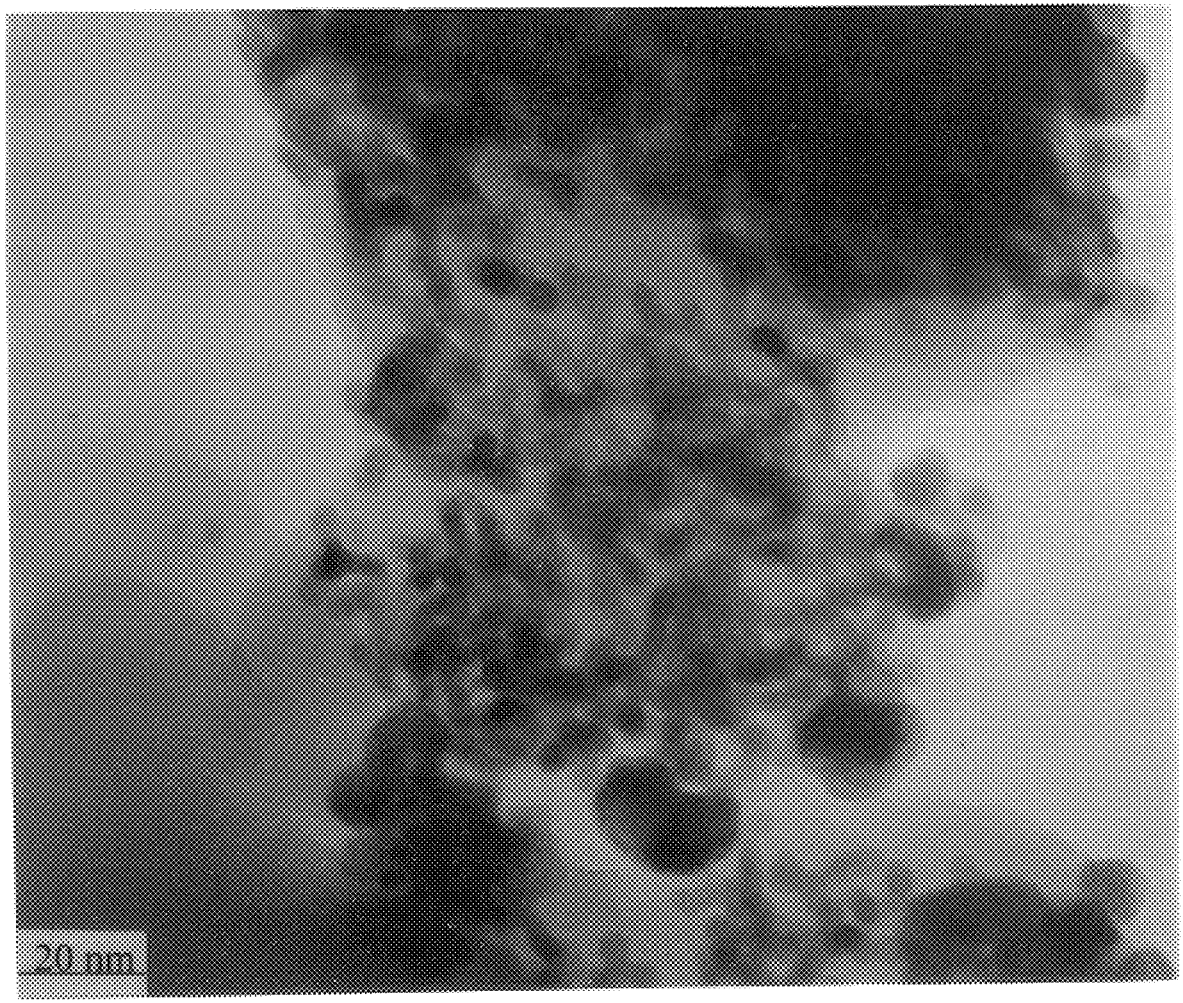
FIG. 7 shows a transmission electron micrograph of a platinum impregnated KIT-1 sample.

In the X-ray diffraction patterns, respective peaks are found to be wide. The reason for such wide peaks is that the channels of KIT-1 are not regularly arranged but rather randomly arranged. A transmission electron micrograph for the KIT-1 of FIG. 1 demonstrates this random arrangement, as shown in FIG. 6. As seen in this photograph, the channels with a diameter of about 3 nm are randomly interconnected with one another to a short length, e.g. 2 to 5 nm, in a three dimensional way. Because the interconnection pattern of the channels is similar to that of disordered plastic sponge, KIT-1 shows an isotropic structure lacking in orientation. An electron diffraction pattern (not shown) also revealed the random structure of KIT-1 as seen in the X-ray diffraction pattern or electron microscopic photograph. However, it is difficult to judge with the transmission electron micrograph of the channels whether short passages are interconnected or long straight channels get tangled like noodles. FIG. 7 is a transmission electron micrograph showing wiry platinum grown along the channels formed in the structure of KIT-1 of FIG. 1. From this photograph, it is apparent that the channels of KIT-1 are randomly arranged interconnecting with one another in a three-dimensional way and thus, KIT-1 has a quite different structure from the long straight structure of MCM-41.

Figure 8:
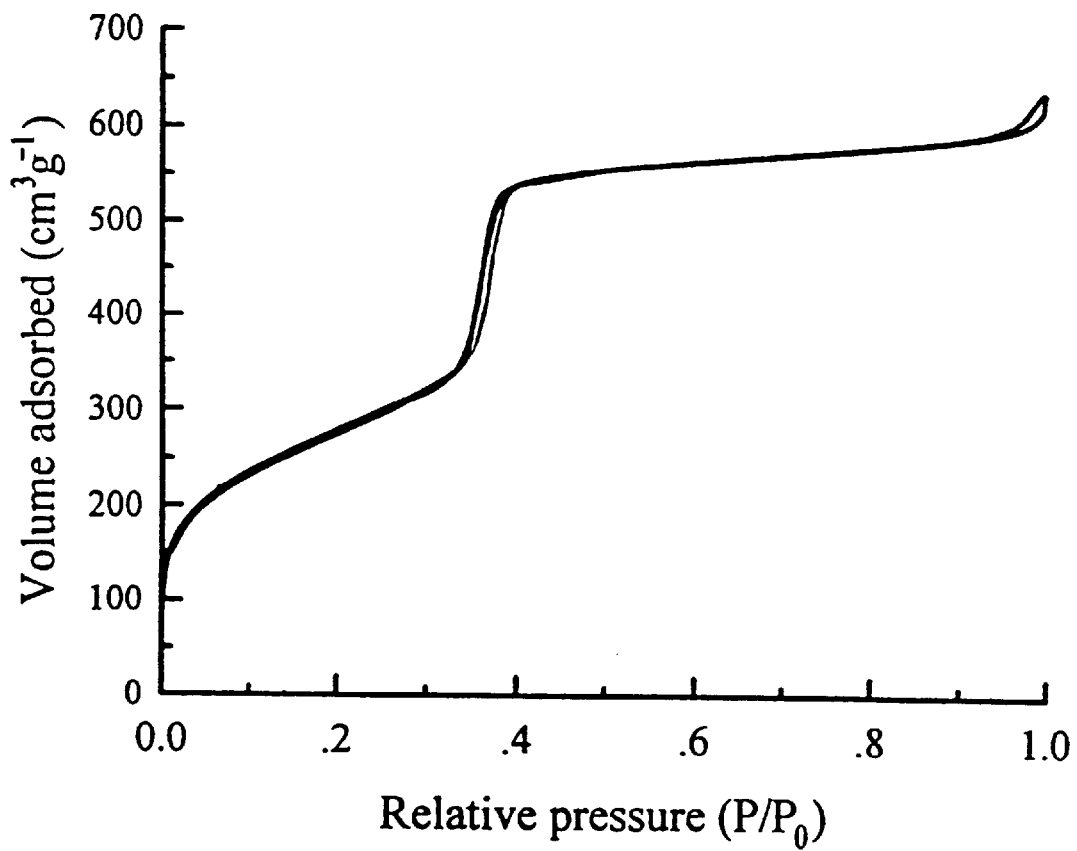
FIG. 8 shows $N_2$ adsorption-desorption isotherms at liquid $N_2$ temperature for KIT-1 synthesized using EDTANa$_4$.
Figure 9:
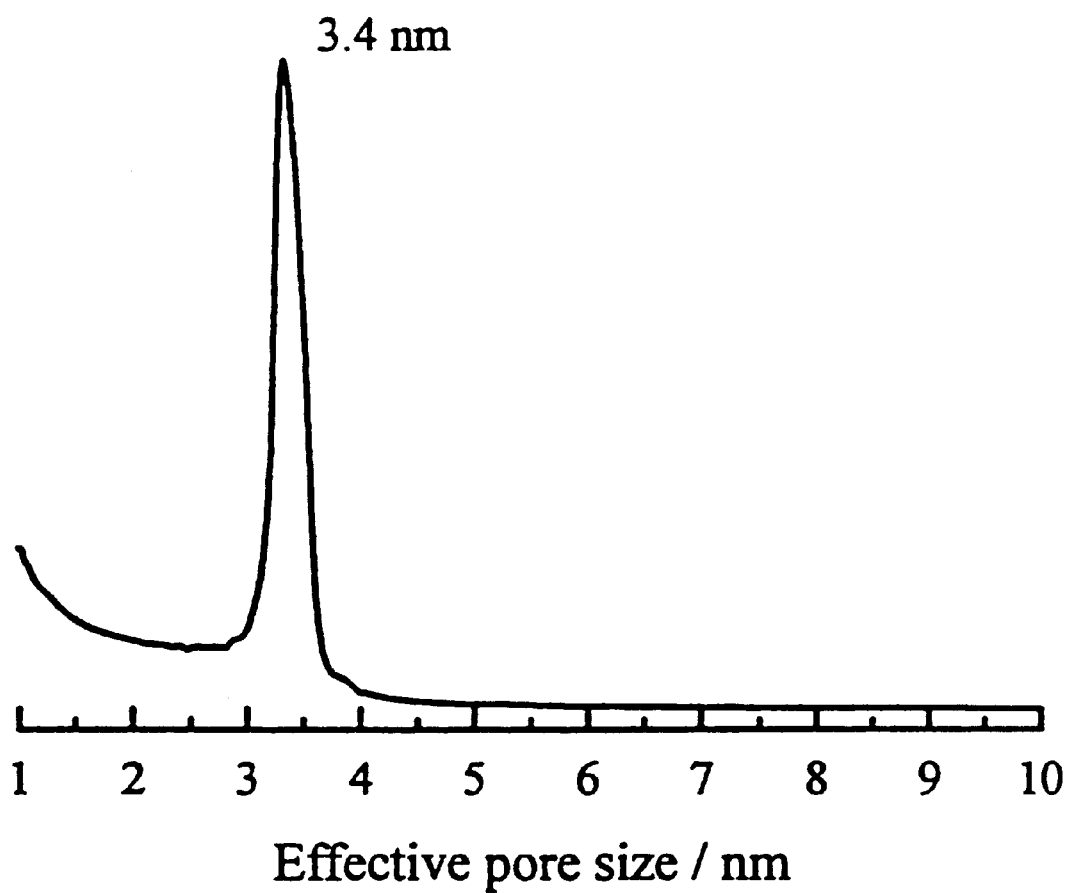
FIG. 9 shows a pore size distribution curve for KIT-1, obtained from $N_2$ adsorption-desorption isotherms of FIG. 8 by means of the Horvath-Kawazoe method.
Figure 10:
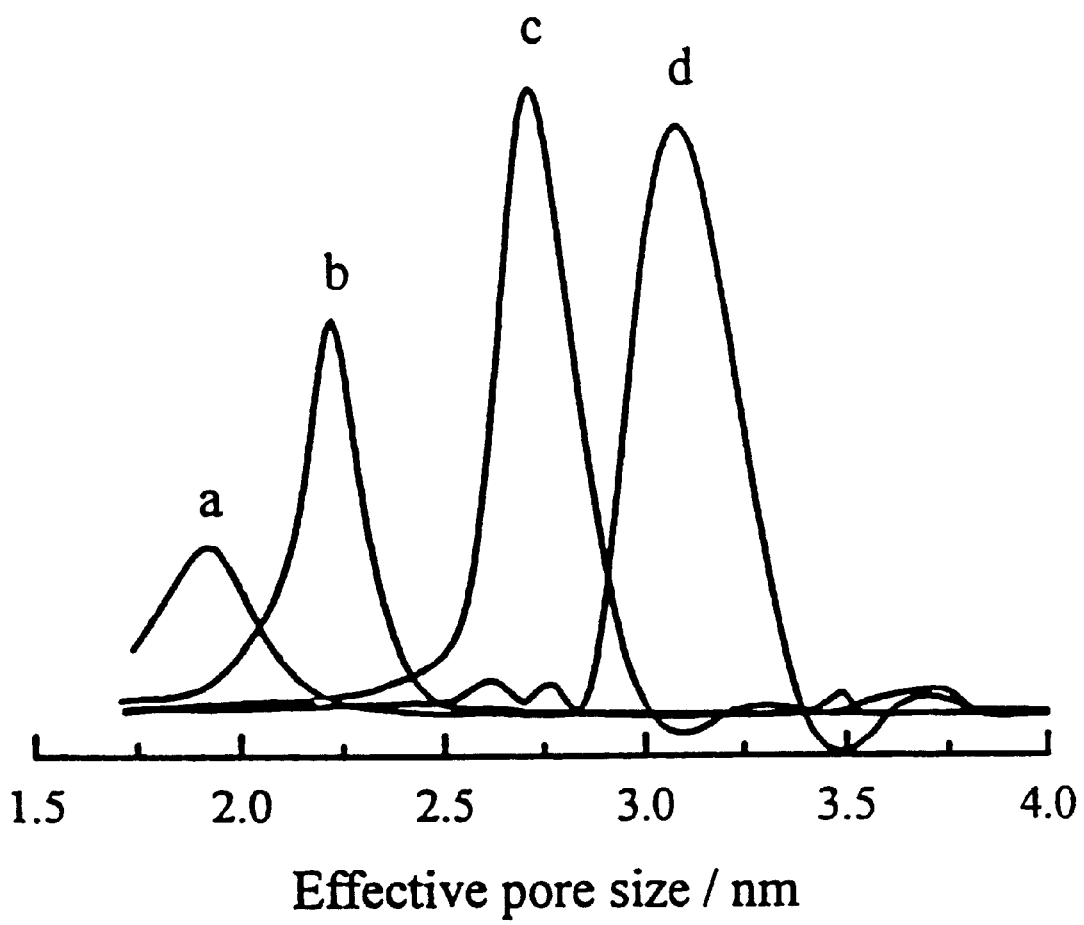
FIG. 10 shows pore size distribution curves for KIT-1 samples synthesized using surfactants having various alkyl chain lengths, obtained by means of BJH method.

FIG. 8 shows nitrogen adsorption-desorption isotherms at liquid nitrogen temperatures for the KIT-1 of FIG. 1, synthesized using EDTANa4. As in MCM-41, an abrupt transition in nitrogen adsorption occurs at about 0.4 of relative pressure, $P/P_O$. FIG. 9 shows a pore size distribution curve for the channels of KIT-1, obtained from the nitrogen adsorption-desorption isotherms at liquid nitrogen temperature by means of the Horvath-Kawazoe method. As shown in FIG. 9, while being randomly interconnected, the channels of KIT-1 show quite narrow size distribution at 3.4 nm (the line width is not more than 1 nm at medium height). FIG. 10 shows pore size distribution curves that are obtained by means of the BJH method, as in FIG. 5, for the samples synthesized using surfactants of various alkyl chain length. This shows a similar pattern to the change of $d_{100}$ obtained in the X-ray diffraction analysis.

Figure 11:
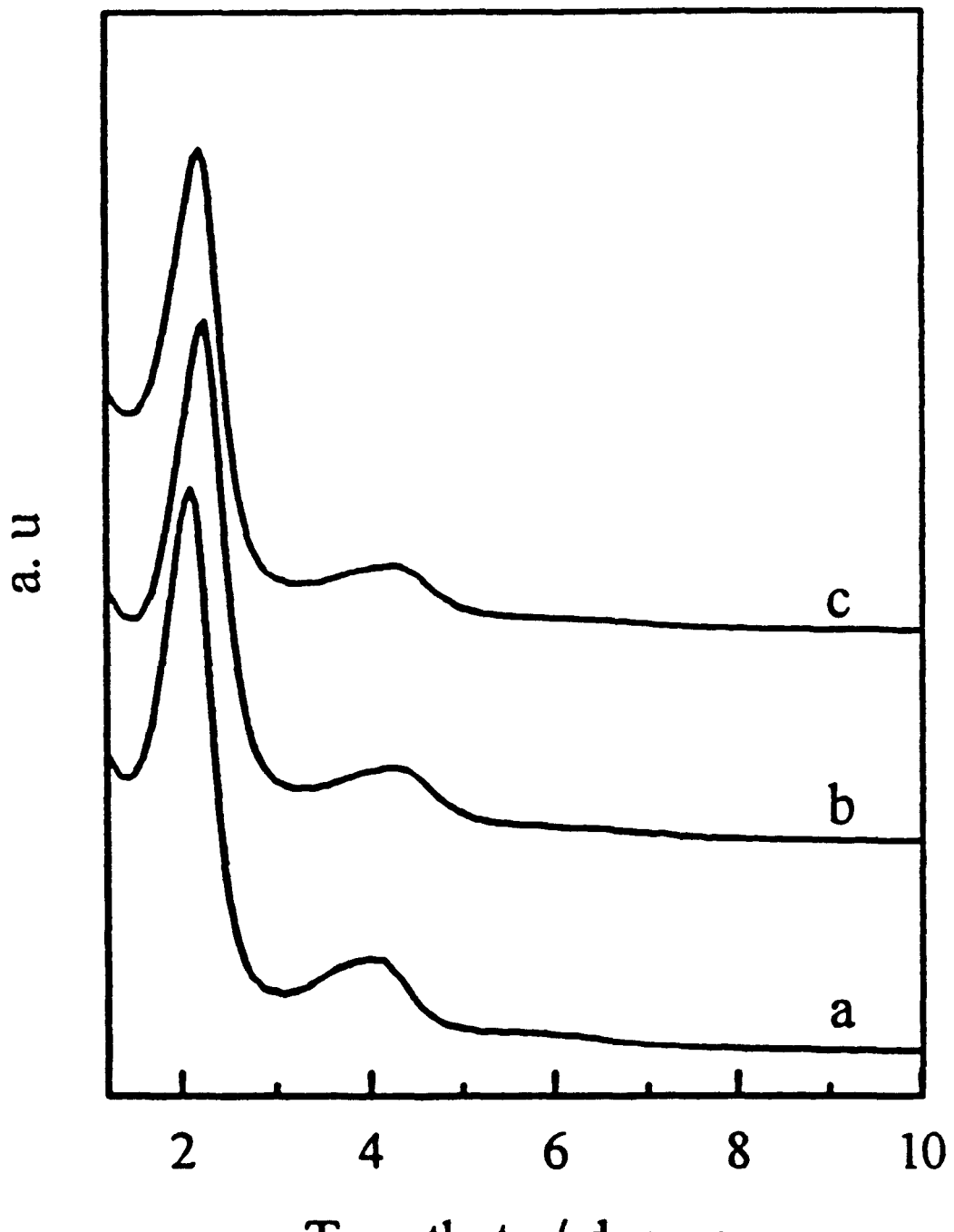
FIG. 11 shows X-ray diffraction patterns after subjecting the calcined KIT-1 sample of FIG. 1 to various thermal treatments.

FIG. 11 shows X-ray diffraction patterns obtained after the calcined KIT-1 of FIG. 1 is tested for thermal stability through various thermal treatments.

In FIG. 11, reference character "a" refers to calcined KIT-1 without additional thermal treatment; reference character "b" refers to a sample after temperature is raised up to 900° C. at a rate of 100° C./hr under an oxygen atmosphere containing water vapor with a pressure of 2.3 kPa and maintained for 2 hrs; and reference character "c" refers to a sample after temperature is raised up to 750° C. at a rate 100° C./hr in 100% water vapor under a pressure of 1 atm and maintained for 2 hr. As apparent from FIG. 11, KIT-1 can stably maintain its structure at up to 900° C. under such conditions. In addition, even when it is maintained for 2 hr. under a 100% water vapor atmosphere, KIT-1 is not destructurized at up to 750° C.

Figure 12:
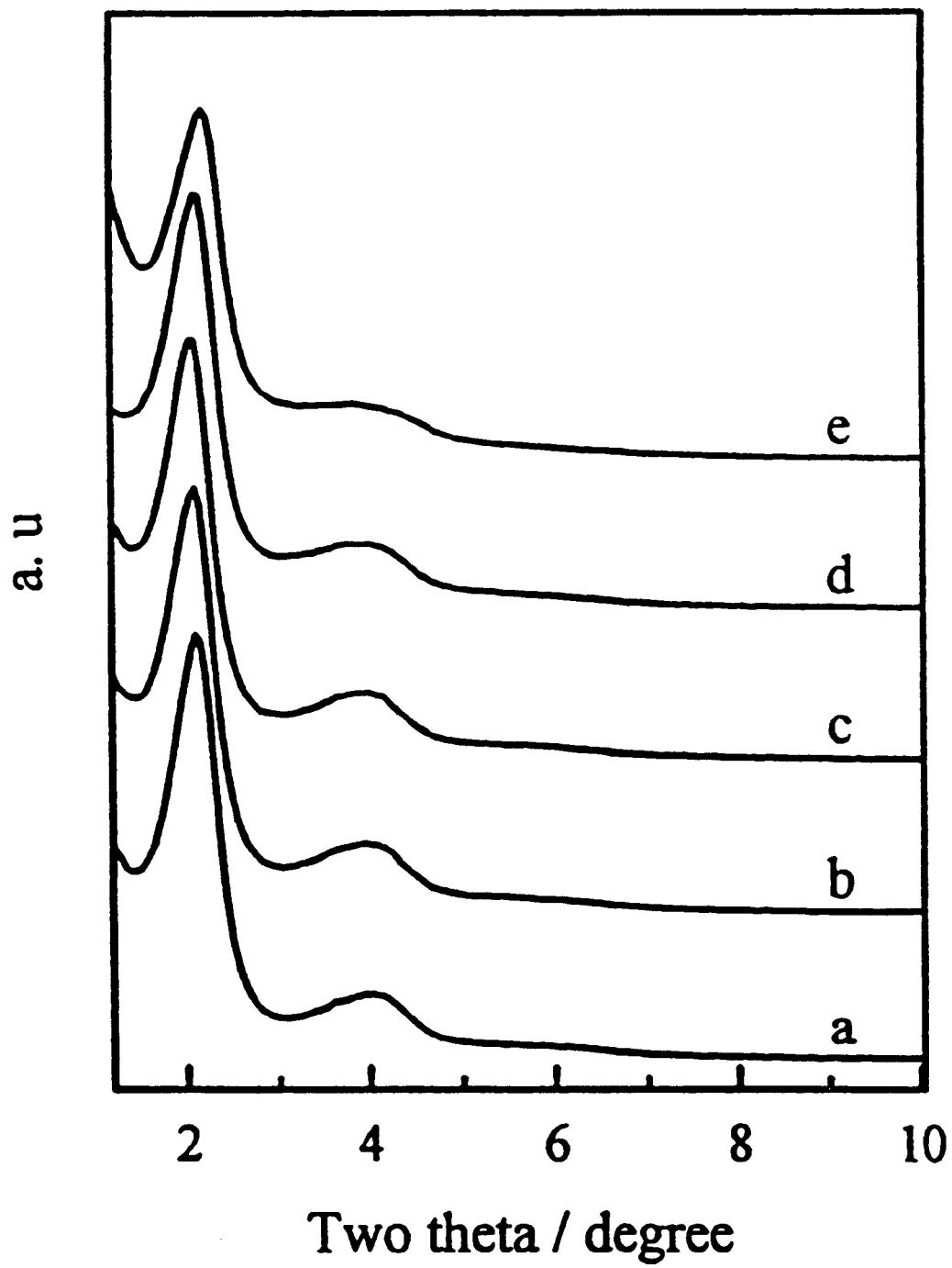
FIG. 12 shows the change of the X-ray diffraction pattern for the calcined KIT-1 sample of FIG. 1 with time when it is placed in boiling water of 100° C.

FIG. 12 shows the results obtained from the hydrothermal stability test of the calcined KIT-1 of FIG. 1. In the test, KIT-1 samples were placed in boiling water of 100° C. for 1 hr. (a), for 6 hr. (b), for 12 hr (c), for 24 hr (d) and for 48 hrs. (e). The conventional mesoporous molecular sieves, such as MCM-41 and MCM-48, are completely destructurized within 12 hr under such condition, whereas KIT-1 of the present invention shows no change in structure even after 48 hr. Consequently, KIT-1 is far superior to other conventional mesoporous molecular sieves in hydrothermal stability.

Parts of silicon present in the frame of the mesoporous molecular sieve KIT-1 were substituted with aluminum, resulting in another mesoporous molecular sieve of the present invention, named "KIT-2" (Si/Al=5 to 200). X-ray diffraction pattern and electron microscopic photographs show that the structure of KIT-2 is the same as that of KIT-1.

Figure 13:
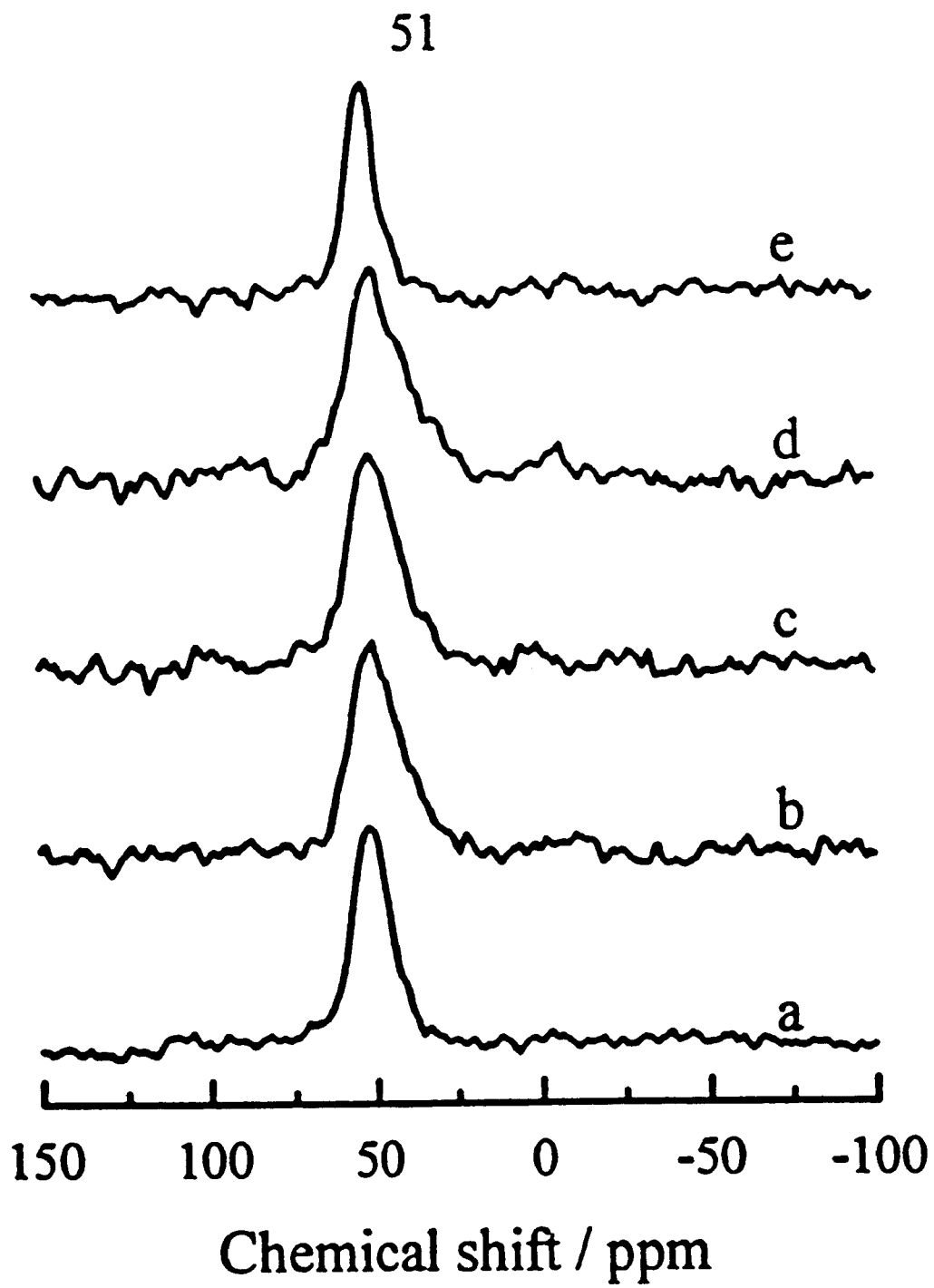
FIG. 13 shows solid phase magic angle spin (MAS) aluminum-27 nuclear magnetic resonance (NMR) after subjecting KIT-2 samples to various treatments according to another embodiment of the invention.
Figure 14:
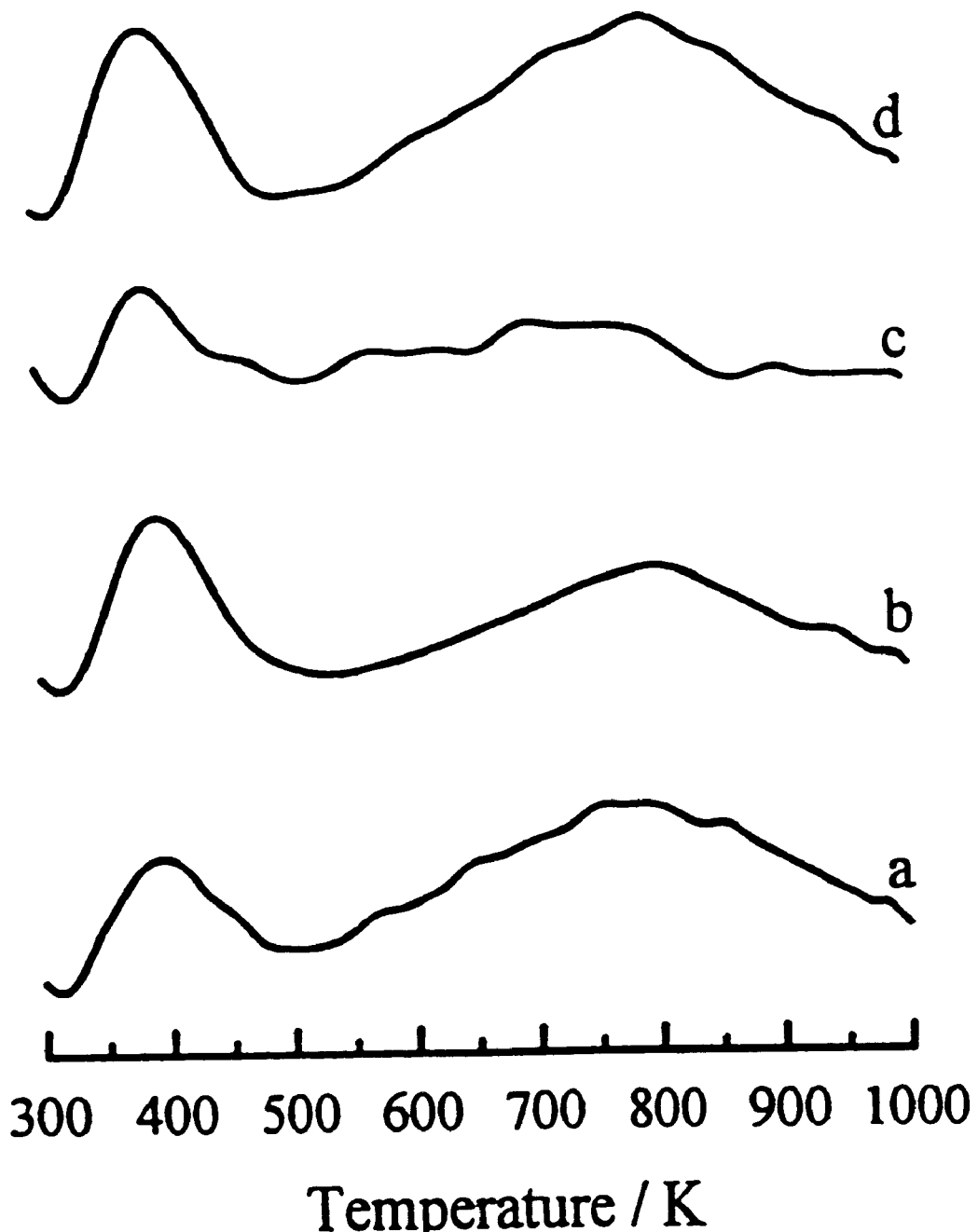
FIG. 14 shows temperature programmed desorption (TPD) of ammonia gas after subjecting KIT-2 samples (Si/Al=40) to various treatments according to another embodiment of the present invention.

With reference to FIGS. 13 and 14, the results obtained for the tests of KIT-2 for thermal stability and hydrothermal stability, respectively, are shown. In FIG. 13, results are shown for KIT-2 samples with Si/Al of 40 (corresponding to z=0.05 in Example 4 to be described below) subjected to solid phase magic angle spin (MAS) aluminum-27 nuclear magnetic resonance (NMR). The results are obtained before calcination (a); after calcination (b); after temperature was raised up to 500° C. at a rate of 100° C./hr under an oxygen atmosphere containing water vapor of 2.3 kPa and then maintained for 2 hr (c), after temperature was raised up to 900° C. at a rate of 100° C./hr under an oxygen atmosphere containing water vapor of 2.3 kPa and then, maintained for 2 hr (d); and after being placed in boiling water of 100° C. for 12 hr (e). As seen in FIG. 13, KIT-2, like KIT-1, was not destructurized by such thermal treatments or hydrothermal treatments but rather allowed the substituted aluminum to maintain the tetrahedral structure.

In FIG. 14, temperature programmed desorption (TPD) of ammonia gas was carried out for the KIT-2 samples obtained after calcination (a); after temperature was raised up to 500° C. at a rate of 100° C./hr under an oxygen atmosphere containing water vapor of 2.3 kPa and then maintained for 2 hr (b); after temperature was raised up to 900° C. at a rate of 100° C./hr under an oxygen atmosphere containing water vapor of 2.3 kPa and then, maintained for 2 hr (c); and after being placed in boiling water of 100° C. for 12 hr (d). These TPD results show that KIT-2 has simultaneously a weak acid point and a strong acid point. After the treatment at 900° C. under an oxygen atmosphere containing water vapor of 2.3 kPa for 2 hr and the treatment with boiling water of 100° C. for 12 hr KIT-2 kept its acid points, which demonstrates its superiority in thermal stability and hydrothermal stability. Since KIT-2 has an ion-exchange ability like zeolite, it is suitable to support catalytically active materials.

Various metal ions were incorporated in KIT-2 (Si/Al=40, corresponding to z=0.05 in Example 4 to be described later) at such amounts as indicated in Table 1, and then calcined at 550° C. for 10 hr in air and reduced under a hydrogen atmosphere to form metal clusters. The metal clusters were tested for hydrogen and oxygen adsorption and the results are provided in Table 1 below.

TABLE 1

| Hydrogen and Oxygen Adsorption of Metal Clusters Incorporated in KIT-2 | | |
|---|---|---|
| Sample | H/Pt(H$_2$) | O/Pt(O2) |
| 2 wt % Pt/KIT-2 | 1.70 | — |
| 2 wt % Pt/KIT-2 | 0.68 | 0.51 |
| 2 wt % Ru/KIT-2 | 0.33 | 0.74 |
| 2 wt % Ir/KIT-2 | 1.66 | 0.87 |

Figure 15:
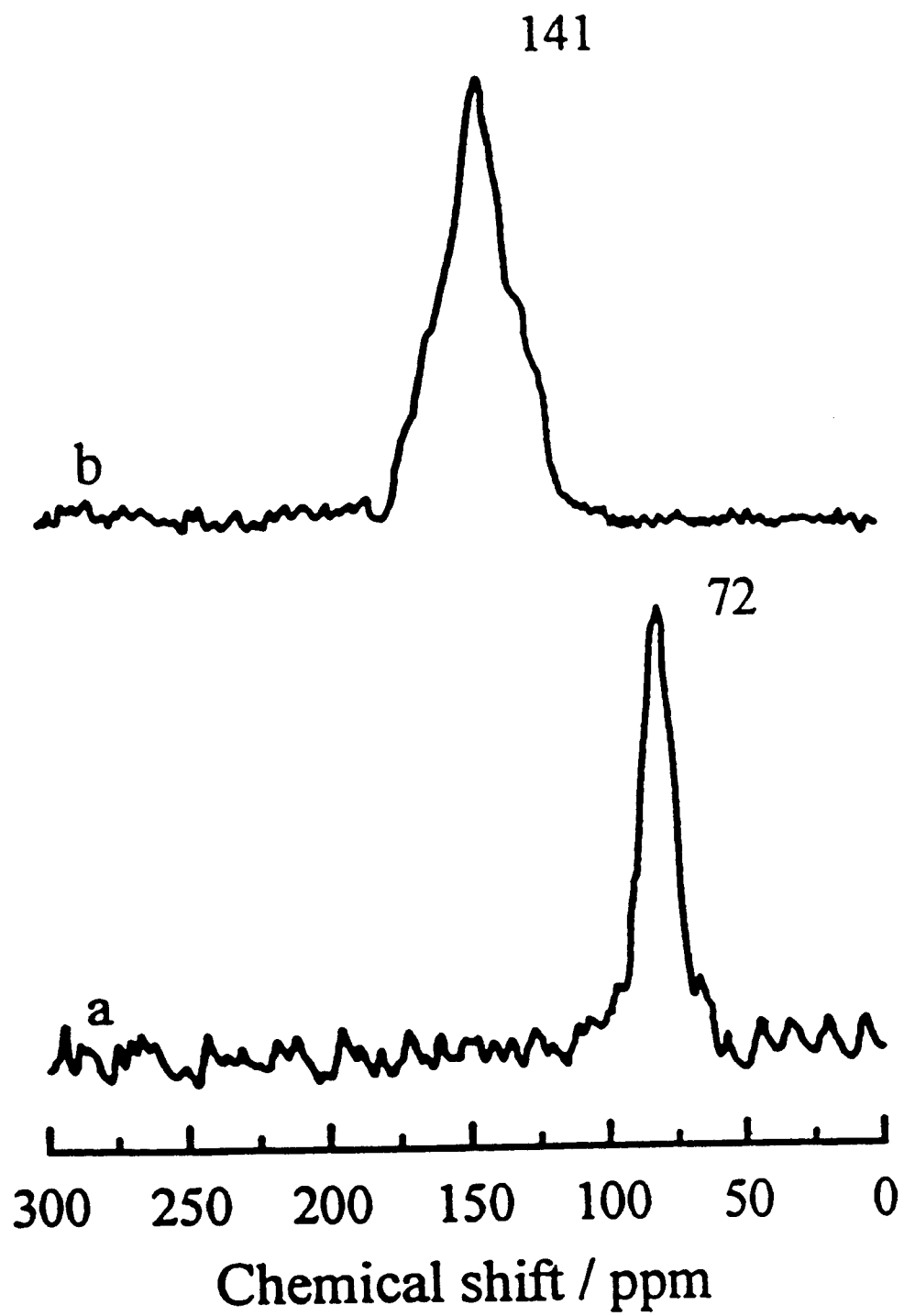
FIG. 15 shows xenon-129 NMR for 2 wt % Pt/KIT-2 synthesized from KIT-2 samples (Si/Al=40) according to another embodiment of the present invention, by means of ion exchange method.

FIG. 15 shows spectra obtained from xenon-129 nuclear magnetic resonance analysis of the platinum clusters obtained by incorporating platinum ion in KIT-2 (Si/Al=40, corresponding to z=0.05 in Example 4 below) at an amount of 2 wt %, then calcining and reducing in the aforementioned manners. Reference character "a" refers to KIT-2 (Si/Al=40, corresponding to z=0.05 in Example 4) and reference numeral "b" refers to 2 wt % Pt/KIT-2. From the results, it is apparent that small clusters of about 1 nm can be formed in KIT-2.

A better understanding of the present invention may be obtained in light of the following examples which are set forth to illustrate, but are not to be construed to limit, the present invention.

EXAMPLE I 0.29 g of 28 wt % aqueous ammonia solution, together with the amounts of 33.3 wt % ethylenediaminetetraacetic acid tetrasodium slat (EDTANa$_4$) suggested in Table 2 below was mixed with 20 g of 25 wt % aqiepis hexadecyltrimethylammonium chloride (HTACl) solution to give Solution A.

Separately, 9.4 g of Ludox HS40 (trade name of DuPont, colloid silica) was mixed with 31 g of 1.0M aqueous sodium hydroxide solution and heated at 80° C. for 2 hr to give Solution B. Solution A and Solution B were mixed with each other by dropwise addition of Solution B for 1 hr at room temperature while vigorously stirring Solution A in a polypropylene bottle with a magnetic bar. In this mixture, the mole ratio of HTACl to (NH$_4$)$_2$O was 1:0.05 with HTACl:SiO$_2$:Na$_2$O=1:4:1. While the mole ratio of EDTANa$_4$/HTACl was changed as indicated in Table 2 below, the mixture was subjected to reaction at 100° C. for 2 days and then cooled to room temperature. Using 30 wt % aqueous acetic acid solution, the reaction mixture was titrated to a pH of 10.2. The procedure of reacting at 100° C. for 2 days, cooling to room temperature and titrating to pH 10.2 was repeated twice more. The precipitate thus obtained was washed with 2° (twice) distilled water and dried at 100° C. To remove the surfactant from the dried sample, calcination was carried out at 550° C. for 10 hr. The resulting KIT-1 substances all provided the same X-ray diffraction patterns as shown in FIG. 1 (prepared with HTACl :(NH$_4$)$_2$O:EDTANa$_4$:SiO$_2$:H$_2$O=1:0.15:4:4:400) and there was little difference between the X-ray diffraction patterns before and after the calcination. As shown in Table 2, $d_{100}$ values were obtained from- the X-ray diffraction patterns for each KIT-1 substance. The specific surface area for KIT-1 was determined to be 1000±50 m$^2$g$^{-1}$, as measured by the BET method utilizing the $d_{100}$ values and the nitrogen adsorption results, as shown in Table 2. The pore size distribution curve for the KIT-1 (prepared from 1:0.15:4:4:400 of HTACl: (NH$_4$)$_2$O:EDTANa$_4$: SiO$_2$:H$_2$O) was obtained to be the same as FIG. 9 by the Horvarth-Kawazoe method, with the other KIT-1 samples each showing similar results.

TABLE 2

$d_{100}$ and Surface Area According to Ratio of EDTANa$_4$/HTACl

| EDTANa$_4$/ HTACl | Amount of EDTANa$_4$ aqueous Sol'n (g) | $d_{100}$ (nm) | Specific Surface Area (m$^2$g$^{-1}$) |
|---|---|---|---|
| 1 | 17.8 | 4.21 | 976 |
| 2 | 35.6 | 4.25 | 995 |
| 4 | 71.3 | 4.24 | 1024 |
| 6 | 107.0 | 4.22 | 1002 |
| 8 | 142.6 | 4.25 | 989 |
| 10 | 178 | 4.23 | 1048 |
| 15 | 267.4 | 4.24 | 1033 |

EXAMPLE II

Surfactants differing in alkyl chain length in Solution A of Example I were used. As indicated in Table 3 below, 25 wt % dodecyltrimethylammonium bromide solution, 25 wt % tetradecyltrimethylammonium bromide solution and 25 wt % tadecyltrimethylammonium bromide solution each were added and mixed with 0.29 of 28 wt % aqueous ammonia solution and 71.3 g of 33.3 wt % aqueous EDTANa$_4$solution to give respective Solution A. For Solution B, the same sodium silicate solution (using Ludox HS40) as Example I was used. The rest of the preparation procedure was carried out in a similar manner to that of Example I while the mole ratio of the surfactants of Table 3, (NH$_4$)$_2$O:EDTANa$_4$:SiO$_2$:Na$_2$O:H$_2$O, was maintained at 1:0.15:4:4:400. The samples thus obtained showed X-ray diffraction patterns similar to FIG. 1 and the change of $d_{100}$ in accordance with the alkyl chain length of surfactant is shown in FIG. 5 and Table 3. From nitrogen adsorption, the specific surface areas were obtained to be 1,000±50 m$^2$g$^{-1}$ following the BET method and each are given as shown in Table 3. FIG. 10 shows the change of pore size with the alkyl chain length of surfactant, obtained by the BJH method.

TABLE 3

$d_{100}$ and Surface Area According to Chain Length of Surfactant

| Surface Surfactant | Amount of Surfactant Aqueous Sol'n (g) | $d_{100}$ (nm) | Specific Area (m$^2$g$^{-1}$) |
|---|---|---|---|
| DTABr | 19.3 | 3.74 | 976 |
| TTABr | 21.0 | 3.93 | 995 |
| OTABr | 24.5 | 4.50 | 1024 |

EXAMPLE III

KIT-1 samples each were synthesized using adipic acid disodium salt, 1,3-benzenedisulfonic acid disodium salt, NaCl and KCl, instead of the EDTANa$_2$ of Example I. Solution A was prepared by adding 30 wt % aqueous solutions of the above salts in the amounts indicated in Table 4 to 20 g of 25 wt % aqueous HTACl solution and 0.29 g of 28 wt % aqueous ammonia solution. For Solution B, the same sodium silicate solution (using Ludox HS40), as Example I, was used. In the resulting reaction mixture, HTACl, (NH$_4$)$_2$O, SiO$_2$, Na$_2$O and H$_2$O were present in mole ratios of 1:0.15:4:1 :y wherein y is the amount of water used; the mole ratio of the above salts/HTACl was changed as indicated in Table 4 below. The rest of the preparation procedure was carried out in a similar manner to that of Example I. The KIT-1 substances thus obtained showed X-ray diffraction patterns as shown in FIGS. 2 to 4. From nitrogen adsorption, the specific surface areas were obtained to be 1,000±50 m$^2$g$^{-1}$ following the BET method and each are given as shown in Table 4.

TABLE 4

$d_{100}$ and Surface Area According to Salt

| Surface Salt | Salt/ HTACl | Amount of salt aqueous Sol'n (g) | $d_{100}$ (nm) | Specific Area (m$^2$g$^{-1}$) |
|---|---|---|---|---|
| Na Adipate | 8 | 79.0 | 4.23 | 998 |
| Na 1,3-BDSA* | 9 | 117.6 | 4.22 | 1027 |
| Na Acetate | 16 | 68.3 | 4.25 | 1041 |
| NaCl | 4 | 12.2 | 4.29 | 995 |
| KCl | 4 | 267.4 | 4.25 | 958 |

*1,3-benzenedisulfonate

EXAMPLE IV 0.29 g of 28 wt % aqueous solution ammonia, together with 71 g of 33.3 wt % ethylenediaminetetraacetic acid tetrasodium salt (EDTANa$_4$), was mixed with 20 g of 25 wt % aqueous hexadecyltrimethylammonium chloride (HTACl) solution to give Solution A. For solution B. the same sodium silicate solution (using Ludox HS40) as Example I was used. 5 wt % sodium aluminate solution in distilled water was used as Solution C. While vigorously stirring Solution A with a magnetic bar in a polypropylene bottle, Solution B was dropwise added for 1 hr at room temperature, followed by dropwise addition of Solution C. In the resulting mixture, the mole ratios of HTACl:(NH$_4$)$_2$O: EDTANa$_4$:SiO$_2$:Na$_2$O: Al$_2$O$_3$:H$_2$O were in a range of 1:0.15:4:4:1 :z:400–500 wherein z is indicated in Table 5 below. The rest of the preparation procedure was carried out in a similar manner to that of Example I.

The KIT-2 samples thus obtained showed X-ray diffraction patterns similar to those obtained in Example I. They were found to have specific surface areas shown in Table 5 as obtained from nitrogen adsorption by the BET method.

A solid phase MAS aluminum-27 nuclear magnetic resonance test for the sample corresponding to z=0.05 is shown in FIG. 13, demonstrating that the aluminum atoms are all of tetrahedral structure. From this data, it is apparent that the aluminum atoms are all present in the frame. The other samples gave similar results.

As shown in FIG. 14, TPD for the ammonia adsorbed in the sample corresponding to z=0.05 simultaneously revealed a weak acid point of 100 to 200° C. and a strong acid point of 400 to 700° C. Similar results were obtained for the other samples.

In KIT-2 samples prepared in such ways, as shown in Table 5 and FIG. 15, small metal clusters were incorporated by ion exchange of the metal ions, reduction and calcination.

TABLE 5

$d_{100}$ and Surface Area According to the Change of z

| z | Amount of NaAlOz Aqueous Sol'n (g) | $d_{100}$ (nm) | Specific Surface Area ($m^2g^{-1}$) |
|---|---|---|---|
| 1.6 | 41.0 | 4.28 | 1024 |
| 0.8 | 20.5 | 4.30 | 1011 |
| 0.4 | 10.2 | 4.27 | 967 |
| 0.2 | 5.1 | 4.24 | 956 |
| 0.08 | 2.1 | 4.21 | 1021 |
| 0.02 | 0.5 | 4.25 | 996 |

Taken together, the data suggested in the Examples revealed that KIT-1 and KIT-2 are of far superior in thermal stability and hydrothermal stability than compared with MCM-41 and do not cause the molecular diffusion barrier attributable to one-dimensional straight channels.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for preparing a disordered mesoporous molecular sieve substance exhibiting a three-dimensionally disordered channel network and a narrow pore-size distribution having a line width less than 0.5 nm at the medium height in a channel size distribution curve obtained from an adsorption isotherm of nitrogen, comprising the steps of:

(A) mixing silicate salt and alklytrimethylammonium halide as a surfactant, represented by the following formula I:

$$C_nH_{2n+1}(CH_3)_3NX \qquad I$$

wherein n is an integer of 12 to 18 and X is Cl or Br, to prepare a mixed aqueous solution;

(B) adding in the mixed aqueous solution one or more water-soluble organic salts selected from the group consisting of ethylenediaminetetraacetate tetrasodium salt, adipic acid disodium salt, sodium acetate, 1,3-benzenedisulfonic acid disodium salt and nitrilotriacetic acid sodium salt;

(C) subjecting the resulting solution to a hydrothermal reaction in such a way that suitable pH and temperature are maintained for a period so as to give precipitates of the molecular sieve substance;

(D) filtering and drying precipitates of the molecular sieve substances; and (E) calcining the filtered and dried precipitates.

2. The method in accordance with claim 1, wherein said surfactant is selected from the group consisting of hexadecyltrimethylammonium chloride, dodecyltrimethyl ammonium bromide, tetradecyltrimethylammonium bromide and octadecyltrimethylammonium bromide.

3. The method in accordance with claim 1, wherein said silicate salt is sodium silicate.

4. The method in accordance with claim 1, wherein said mixed aqueous solution in said step (A) further comprises an ammonia aqueous solution.

5. The method in accordance with claim 1, wherein said step (E) for calcining is carried out at a temperature of 500 to 600° C.

6. A method for preparing a disordered mesoporous molecular sieve substance exhibiting a three-dimensionally disordered channel network and a narrow pore-size distribution having a line width less than 0.5 nm at the medium height in a channel size distribution curve obtained from an adsorption isotherm of nitrogen, comprising the steps of:

(a) mixing silicate salt, one or more salts selected from the group consisting of aluminates, borates and acid salts of 3d transition metals on the periodic table, and alkyltrimethylammonium halide as a surfactant, represented by the following formula I:

$$C_nH_{2n+1}(CH_3)_3NX \qquad I$$

wherein n is an integer of 12 to 18 and X is Cl or Br, to prepare a mixed aqueous solution;

(b) adding in the mixed aqueous solution one or more water-soluble organic salts selected from the group consisting of ethylenediaminetetraacetate tetrasodium salt, adipic acid disodium salt, sodium acetate, 1,3-benzenedisulfonic acid disodium salt and nitrilotriacetic acid sodium salt;

(c) subjecting the resulting solution to a hydrothermal reaction in such a way that suitable pH and temperature are maintained for a period so as to give precipitates of the molecular sieve substance;

(d) filtering and drying precipitates of the molecular sieve substances; and (e) calcining the filtered and dried precipitates.

7. The method in accordance with claim 6, wherein said aluminate is sodium aluminate ($NaAlO_2$).

8. The method in accordance with claim 6, wherein said mixed aqueous solution contains, 1.0 to 15.0 moles of said silicate salt, and 0.0025 to 1.5 moles of said salts selected from the group consisting of aluminates, borates and acid salts of 3d transition metals on the periodic table per mole of the alkyltrimethylammonium halide of Formula I.

9. The method in accordance with claim 6, wherein said surfactant is selected from the group consisting of hexadecyltrimethylammonium chloride, dodecyltrimethyl ammonium bromide, tetradecyltrimethylammonium bromide and octadecyltrimethylammonium bromide.

10. The method in accordance with claim 6, wherein said silicate salt is sodium silicate.

11. The method in accordance with claim 6, wherein said mixed aqueous solution in step (a) further comprises an ammonia aqueous solution.

12. The method in accordance with claim 6, wherein said step (e) for calcining is carried out at a temperature of 500 to 600° C.

* * * * *